Patented Dec. 15, 1925.

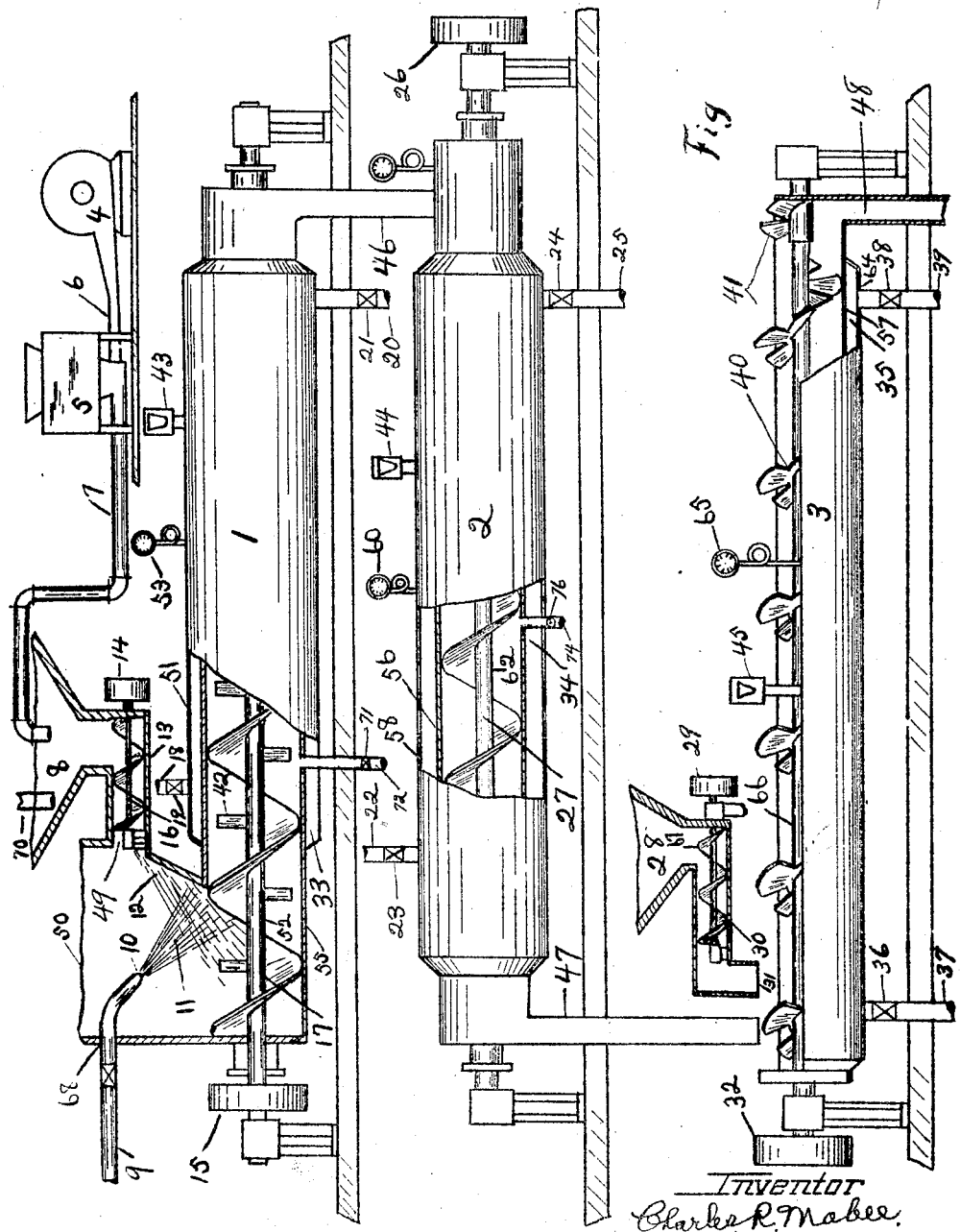

1,565,283

UNITED STATES PATENT OFFICE.

CHARLES R. MABEE, OF BUFFALO, NEW YORK, ASSIGNOR TO MABEE PATENTS CORPORATION, OF DELAWARE.

PROCESS FOR THE CONTINUOUS STEAM MILLING OF VEGETABLE SUBSTANCES.

Application filed August 16, 1920. Serial No. 403,863.

*To all whom it may concern:*

Be it known that I, CHARLES R. MABEE, a citizen of the United States, residing at the city of Buffalo, in the county of Erie and State of New York, have invented certain new and useful Improvements in Processes for the Continuous Steam Milling of Vegetable Substances, of which the following is a specification.

This invention relates to heat and humidity regulating apparatus and the processes carried out thereby, which involve heating, cooking, mixing, compressing, constant endwise movement within a cylindrical container, and finally the breaking up and drying of vegetable substances while under constant movement.

In this process vegetable substances are moistened with vegetable extracts, thoroughly mixed and heated sufficiently to steam the substances and thereby cook them while under continuous movement endwise of a jacketed cylinder. After the cooking has been completed the substances may be mixed with other substances of like character, and the mass dried, or a combination of substances may be moistened with extracts, or with water, thoroughly mixed and heated sufficiently to steam the substances and thereby cook them while under continuous movement endwise of a jacketed cylinder, and thereafter mixed with other substances, if desired, and dried while under movement.

In this specification vegetable substances include those substances termed cereal substances, and while the drawings made a portion thereof show apparatus adapted to carry out my process, various changes may be made as to details without deviating from the invention.

In the accompanying drawing,

Fig. 1 is a plan view partly broken away and in part conventionally shown.

Referring to the accompanying drawing, 1 is a cylindrical container the outer wall of which is shown at 55, 2 is a cylindrical container the outer wall of which is shown at 56, 3 is a container the wall of which is shown at 57.

A blower is shown at 4 connected by the air conveying pipe 6 with the vegetable shredder 5 which in turn is connected by the conveyor pipe 7 with the hopper 8 connected with the upper portion of the tube 13 which is provided internally with the screw conveyor means shown at 16. The screw conveyor is provided at one end with the pulley 14 and at its opposite end with the orifice 49, adapted for the deposit of shredded materials entering the hopper 8 into the hopper shown at 50, attached to one end of the cylindrical container 1.

The cylindrical container 1 is provided with screw conveyor means internal thereof shown at 17, and is surrounded by a jacket shown at 33 the outer wall of which is shown at 51. Means for applying power to the screw conveyor 17 is shown by the pulley 15 affixed to one end of the shaft 52 longitudinally and centrally disposed within the cylindrical container 1. Mixing and propelling blades attached to the shaft 52 are shown at 42. The jacket surrounding the container 1 is provided with a steam inlet connection shown at 18 provided with the regulating valve 19, and with a condensation outlet pipe 20 provided with the regulating valve 21, also with the safety valve 43 and the steam gauge 53.

The cylindrical container 1 is connected by the conveyor pipe 46 with the cylindrical container 2 which is surrounded by the jacket 34 the outer wall of which is shown at 58, in the section partly broken away. The container 1 is used for mixing and heating the materials to be treated, and the container 2 is used to cook the materials. The jacket 34 is provided with a steam inlet connection 22 provided with the regulating valve 23, and with a condensation outlet pipe 25 provided with the regulating valve 24, also with the safety valve 44 and the steam gauge 60.

Longitudinally disposed centrally of the container 2 is the shaft 62 on which is mounted the screw conveyor means shown at 27. The shaft 62 is provided with the pulley 26 at one end, and at the opposite end with the conveyor pipe 47 to deposit the materials treated into the container 3, for drying.

The container 3 around and about its lower portion is surrounded by the steam jacket 35 the outer wall of which is shown at 64. The jacket is provided with a steam inlet pipe 37 provided with the regulating valve 36 and with the condensation outlet pipe 39 provided with the regulating valve 38, also with the safety valve 45 and the steam gauge shown at 65.

Longitudinally and centrally disposed within the container 3 is the shaft 66 to which is attached the castings shown at 40 provided with the blades 41. The pulley 32 is mounted upon one end of the shaft 66 for rotation, and the conveyor pipe 48 provides means for the removal of the substances treated from the container 3.

The cylindrical container shown at 30, provided centrally thereof with the screw conveyor means shown at 67 connected with the hopper 28, provides means for the introduction through the orifice 31 of other materials into the container 3, to be mixed by means of the blades 41 and dried by the heat transferred from the jacket 35.

The pipe connection 9 passing through the wall of the hopper 50 at 68, provides means for the introduction of liquid substances into the hopper 50, and at 10 is shown a spray jet connection for moistening the shredded materials passing out of the orifice 49 into the hopper 50. The shredded materials are shown entering the hopper at 12, and the sprayed materials are shown at 11 commingling with the shredded materials.

In practicing my inventions the materials from the shredder 5 are deposited by means of the blower 4 the connecting pipe 6 and the conveyor pipe 7 into the hopper 8 and pass there through into the cylinder 13, and by power applied to the pulley 14 are forced by the conveyor 16 through the orifice 49 into the hopper 50.

The hopper 8 is provided with the inlet pipe 70 for the introduction of other materials therein, such as cereal products, to be mixed with the materials shredded by the mechanism shown conventionally at 5, and which may consist of a hay and fodder cutter, shredder or grinder, as may be desired.

The valve 19 in the steam inlet pipe 18 is adjusted for the entry of a heating medium into the jacket 33, and the condensation outlet pipe 20 is usually connected with a steam trap, and the valve 21 adjusted accordingly.

Power is applied to the shaft 52 by the pulley 15 and the materials passing from the hopper 50 into the container 1 are moved circumferentially by the blades 42 and longitudinally or endwise from left to right by the screw conveyor means shown at 17, and leaving the cylindrical container 1 through the pipe 46 are deposited in the cylindrical container or cooker shown at 2. Power is applied through the pulley 26 attached to the shaft 62 and the materials introduced therein are conveyed from right to left through the container 1 and passing through the outlet pipe 47 are deposited in the container or drier shown at 3.

The materials are cooked within the container 2 by means of steam introduced through the pipe 22 into the jacket 34, the regulating valve 24 in pipe 25 being adjusted to maintain the jacket 34 free from condensation from the steam entering the jacket. Steam is also introduced through the pipe 72 guarded by the valve 71, directly into cylindrical container 1. The rotation of the shaft 62 is such that a sufficient time allowance is made to substantially cook the materials by means of steam generated from the moisture in the materials sprayed through the jet 10 in the hopper 50 attached to container 1.

The liquid materials are preferably heated to about 200 degrees Fahrenheit before being sprayed through the jet 10, and are heated while passing through the mixer and heater cylinder 1 sufficiently that a material amount of steam is generated therefrom which permeates the materials to be treated. The size of the conveyor pipe 46 connecting cylinder 1 with cylinder 2 is such that the materials pass there through under pressure, as through a restricted orifice, and the materials while passing through the cooking cylinder 2 are increased as to temperature and the size of the conveyor pipe 47 leading from the cooker 2 to the drier 3, constitutes a restricted orifice, and is so adjusted as to materially compress the materials, and thereby a material pressure is maintained within the cooker 2, sufficient to cook the materials by contact with steam generated from the liquid materials introduced through the jet 10. Steam is also admitted into container 2 by the pipe 74 provided with the regulating valve 76.

Where it is desirable to introduce other materials into the drier 3 to be mixed with the cooked materials entering therein, the materials so to be mixed are introduced into the hopper 28 and fed uniformly at a predetermined rate by means of the screw conveyor 67 connected with the hopper 28, and are deposited from the orifice 31 into the drying cylinder 3, and after passing endwise from left to right through the drying cylinder 3, the materials introduced therein are withdrawn by means of the outlet pipe 48, in a substantially dry state.

It is obvious that many different materials and combinations of materials are susceptible to steam milling treatment by this process of continuous mixing, heating, cooking, compressing, mixing and drying of materials.

It is obvious that by my process a great variation in temperatures, speed of movement, and degrees of compression of the materials, may be employed, and that the length of the cylinders and the duration of treatment will of necessity depend upon the rapidity of the introduction of materials, and the nature of the materials so introduced.

In treating materials in this series of containers, namely, 1, 2 and 3, the substances treated are compressed to a material degree in container 1 and heated therein to a degree approximating the boiling point of water, while the substances treated are compressed to a still greater degree in container 2 and heated therein to a degree exceeding that of the boiling point of water. It is obvious that the process involves treatment of materials in a series comprising additional containers, without deviating from the invention.

What I claim is—

1. A method for the treatment of vegetable materials, which comprises admixing said materials and subjecting the same in a moistened condition to the influence of an elevated temperature and to a pressure above atmospheric, while alternately compressing and releasing the said vegetable materials, all in a continuous manner.

2. A method for the treatment of vegetable materials, which comprises admixing said materials, compressing and heating in a moistened condition at a temperature of about 200° F. and then further compressing and heating at a temperature of about 212° F., and finally drying said materials, all in a continuous manner.

3. A method for the treatment of vegetable materials, which comprises admixing said materials, compressing and heating in a moistened condition at a temperature of about 200° F., then further compressing and heating at a temperature of about 212° F., admixing other materials therewith, and finally drying, all in a continuous manner.

4. A method for the treatment of vegetable materials, which comprises admixing said materials with liquid materials and subjecting the same in a moistened condition under constant agitation to the influence of pressure and heat at a temperature of about 200° F. and then at a temperature of about 212° F., and finally drying said materials, all in a continuous manner.

5. A method for the treatment of vegetable materials, which comprises admixing said materials with liquid materials at a temperature of about 200° F. and then subjecting the same in closed receptacles to the influence of an elevated temperature and a pressure above atmospheric, while alternately compressing and releasing said materials..

6. A method for the treatment of vegetable materials, which comprises admixing said materials with liquid materials at a temperature of about 200° F. and then subjecting the same to alternate compression and expansion, first at a temperature of about 200° F. and then at a temperature of about 212° F. and finally drying, all in a continuous manner.

7. A method for the treatment of vegetable materials, which comprises admixing said materials with liquid materials at a temperature of about 200° F. and then subjecting the same to alternate compression and expansion, first at a temperature of about 200° F. and then at a temperature of about 212° F., admixing other vegetable substances therewith and finally drying, all in a continuous manner.

CHARLES R. MABEE.